Oct. 27, 1942.  L. E. BURNS ET AL  2,299,722
METHOD AND APPARATUS FOR STRAINING, BENDING,
AND VIBRATION-DETECTING TESTS
Filed Aug. 7, 1939
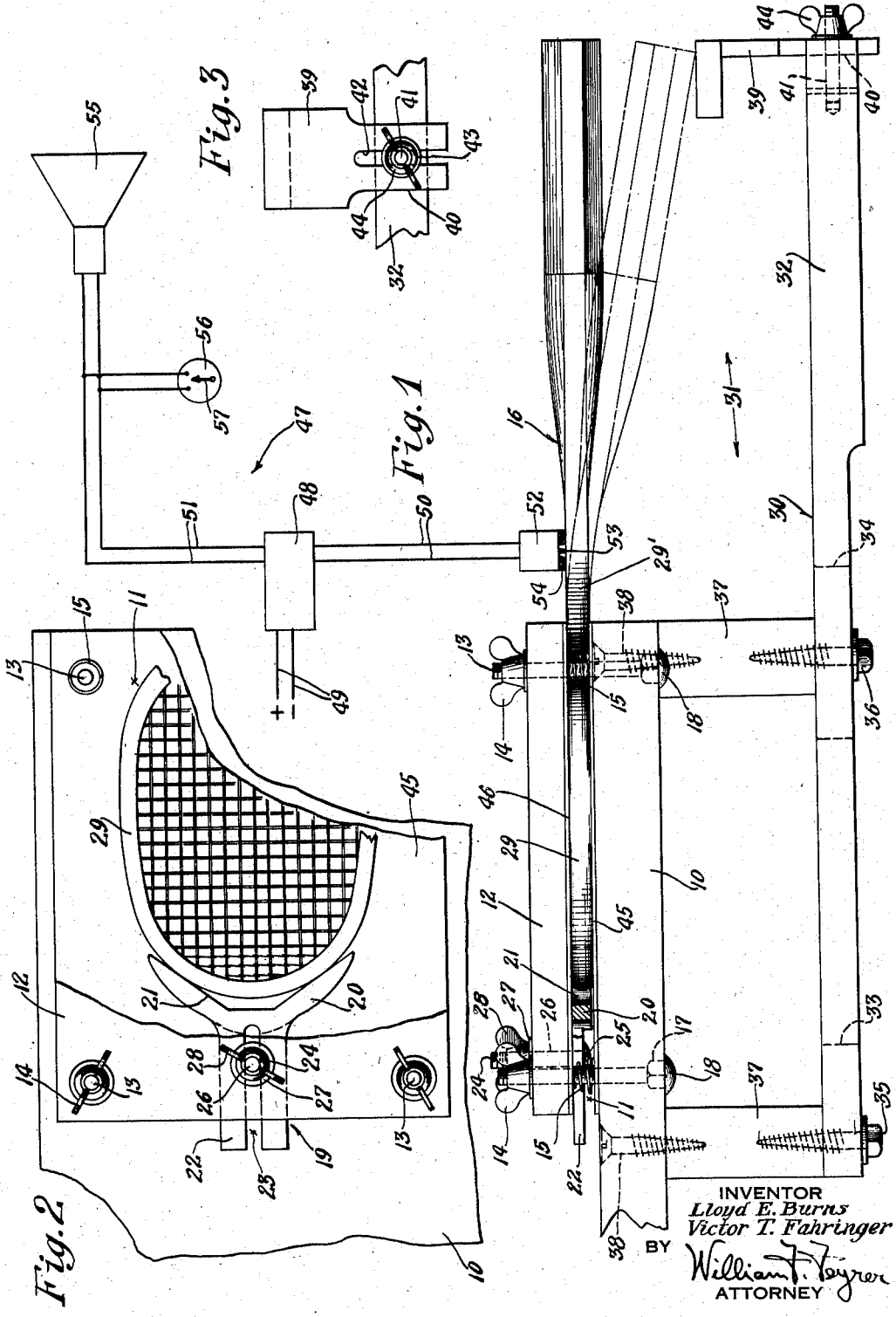
INVENTOR
Lloyd E. Burns
Victor T. Fahringer
BY
William F. Toyrer
ATTORNEY Patented Oct. 27, 1942

2,299,722

UNITED STATES PATENT OFFICE 2,299,722

METHOD AND APPARATUS FOR STRAINING, BENDING, AND VIBRATION-DETECTING TESTS

Lloyd E. Burns, Springfield, and Victor T. Fahringer, Longmeadow, Mass., assignors to A. G. Spalding & Bros. Inc., New York, N. Y., a corporation of Delaware Application August 7, 1939, Serial No. 288,738

8 Claims. (Cl. 73—51)

This invention relates to improvements in testing devices, and particularly to apparatus for testing sports equipment such as tennis, squash and badminton rackets. Although the present invention has proven highly advantageous in the testing of sports equipment its use is equally applicable and highly advantageous in other fields.

In the manufacture of rackets, even though the highest quality woods are used, it has heretofore been impossible to adequately determine the strength of the final structure. Although great care is exercised in selecting wood of the highest quality as the rackets are initially formed, certain inherent weaknesses may exist in the wood or pieces of wood used which are not apparent even upon very close visual inspection thereof. Also, even though great care is exercised in making the so-called laminated types of rackets by gluing or otherwise adhesively securing together a number of wood, fiber and/or rawhide laminations, certain weaknesses may exist which are not apparent upon visual inspection.

It is an important object of the present invention to provide an apparatus for testing rackets in order to determine whether there are certain inherent weaknesses in the wood, and also to determine whether there are certain weaknesses in the adhesively secured laminations.

It is a further important object of the present invention to provide an improved method for testing various articles, such as rackets.

In meeting this objective the present invention contemplates the provision of a special apparatus for receiving and holding a section of the article which is to be tested so that the other section thereof may be strained or bent within a certain field, or field of test, so that if there are any weaknesses therein they will be disclosed. In conjunction therewith the present invention provides amplifying apparatus which may be applied to the article which is being tested so that if it does crack, snap or in any other way "let go" while being passed or moved through the field of test or strain the operator will be thoroughly and quickly apprized.

A further feature includes the provision of apparatus which will accommodate various sizes and shapes of articles and in which the field of test may be altered considerably.

Other objects, features and advantages will be apparent, or will appear hereinafter.

In the drawing:

Figure 1 is a side view illustrating the present preferred form of testing apparatus provided by the present invention and illustrating the method of using the same.

Fig. 2 is a fragmentary top view of the apparatus shown in Fig. 1 and particularly showing the locator therein.

Fig. 3 is a fragmentary end view of the stop device.

Before describing the present improvements and mode of operation thereof in detail it should be understood that the invention is not limited to the details of construction and arrangement of parts shown in the accompanying drawing, which is merely illustrative of the present preferred embodiments, and the phraseology employed is for the purpose of description and not of limitation.

Referring now in detail to the drawing which illustrates the present preferred form of the invention, there is disclosed a base 10 which may be the top of a regular bench but is preferably a tablelike top supported by any usual legs or brackets from the floor.

A socket 11 is provided to receive articles which are to be tested. At present the preferred form of socket includes the base 10 together with a top plate 12 which may be maintained in a predetermined position relative to the base as by a plurality of upwardly extending screws 13 and wing nuts 14. Preferably springs 15 are provided to maintain the top plate in a raised position relative to the base so that the socket will at all times be open and in a position to receive the work, such as a racket 16, which is to be tested. Preferably the bolts are secured to the base, against turning, as by enlarged square sections 17 underneath the heads 18 fitting into suitable sockets therefor in the underside of the base. Also, washers are preferably provided underneath the wing nuts 14 so that adverse crushing of the wood underneath the wing nuts is prevented at the time the racket or other article is bent or strained. The top plate may be tightened down on the article being tested or may be set from the base just enough to allow the articles to be easily slid into and out of the socket.

Preferably a stop or locator 19 is provided to locate the articles which are to be tested in a predetermined position within the socket 11. A simple structure for this purpose includes the provision of a locator plate 20 having a suitable V-shaped nesting section 21 at the forward end thereof as may be seen best in Fig. 2, and having a rearwardly extending tongue 22 provided with a suitable elongated slot 23 for receiving a holding screw 24. The latter has a head 25 underlying the tongue 22 and a shank 26 extending upwardly through the elongated slot and thence through the top plate 12 above the upper surface of the latter where it receives a suitable washer 27 and wing nut 28. It is merely necessary to move the V-shaped section 21 thereof into any desired location within the socket 11 in order to stop the bow 29 of a racket or the like 16 in the same location each time within the socket and then to lock the locator in that preferred position as by tightening the wing nut 28.

Now, of particular importance, the present invention provides a stop device 30 which forms a testing field 31 for any articles which may be placed in the socket or holding means 11. In its present preferred form this stop device includes a horizontally movable member 32 which is preferably provided with elongated slots 33 and 34 adapted to accommodate screws 35 and 36 secured to downwardly projecting lugs 37 which are suitably affixed to the base 10 as by screws 38. At the outer or forward end of the horizontally disposed member is a vertically adjustable stop member 39. The latter is preferably in the form of an inverted L-shaped plate which is vertically movable in a recess 40 and which is held in the desired vertical position as by a screw 41 passing through an elongated slot 42 in the member 39 topped by a washer 43 and lock nut 44.

Preferably the top of the base 10 and the underside of the top plate 12 are provided with facings 45 and 46 of felt, cheap rubber or other sound-deadening material suitably held in place as by glue or other adhesive. This serves both to protect the articles being tested from abrasion, and reduces extraneous noises being transmitted to the article.

The socket 11 allows the part of the article therein which is being tested (e. g., the bowed section 29 of a racket) to flex and strain, much the same as the portions adjacent the socket (e. g., the throat section 29' of a racket). Thus, it is possible, according to this invention, to test the enclosed as well as the exposed parts of the article.

The present invention also contemplates the provision of a suitable amplifying apparatus 47 which may be superposed upon or otherwise associated with the article which is being tested and which will either or both visually and audibly detect weaknesses in the article as it is tested. This amplifying apparatus may be a stethoscope, applied to the article. Preferably, however, it is electrical and includes an amplifier 48, which may be of conventional type, and which is shown schematically in Fig. 1, including a connection to usual feed lines 49. Suitable lead-in and lead-out lines 50 and 51, respectively, are connected to the amplifier. The lead-in lines 50 are connected to an electrical pickup 52 which is preferably a contact microphone, including a contact button 53 adapted to engage with the article being tested, and a felt pad or pads 54 for maintaining the contact button in proper relation relative to the article. The felt pad also prevents adverse noises from being transmitted to the body or casing of the contact microphone. The lead-out lines 51 extend to a loud speaker 55 and/or to a voltmeter 56, which give a quantitative measure of the sound set up in the article tested.

Use of the apparatus just described in detail is as follows: The socket 11 is set at the desired height or opening to accommodate the bow 29 of a racket to be tested for example, or some other article, as by loosening or tightening the wing nuts 14. Also, the locator 20 is moved into the desired position as by loosening the wing nut 28 so that the article which is to be tested is allowed to enter the socket 11 just the right extent and the locator is held in the desired position by tightening the wing nut 28 again.

When the racket or other article is so located in the socket 11 the stop device 30 is moved into the desired position both horizontally and vertically relative to the end of the racket 16, or the like, where it is locked in place by tightening the screws 35 and 36 and the wing nut 44. The dot-and-dash lines in Fig. 1 indicate a lowered testing position of the racket and schematically illustrate the field of test which the article is subjected to while it is in the socket 11. In cheaper rackets where exceedingly high performance is not expected the stop would be set at a higher position relative to the normal position of the racket whereas in a more expensive racket it would be set at a lower position whereby the higher quality rackets would be subjected to a greater strain and test.

After the testing apparatus is set in the preferred positions for the straining and testing of a run of a particular article, it is merely necessary for the operator to take successive rackets 16, or the like, slide them into the socket 11 up to the locator 20 and then press the outer or handle end thereof toward and to the stop 39. Concurrently the operator will hold the electric pickup device against the exposed section of the racket, preferably approximately in the position shown in Fig. 1. If there are any weaknesses inherent in the wood or in the gluing of the laminations the same will "let go" at the time the racket handle is pressed down. Such "let go" might be in the nature of a breaking or separation of the wood or laminations and might be apparent by a cracking or like sound from the racket. Normally this cracking or breaking would not be apparent to the eye, and the sounds thereof would not be apparent to the unaided ear. However, with the pickup and amplifier device 47 any sounds set up in the racket would be caught by the pickup 52, transmitted to the amplifier 48 and then made apparent visually to the operator by a deflection of the needle 57 in the voltmeter 56, or audibly by a pronounced or amplified sound emitted from the loud speaker 55. Preferably each racket is first tested as shown in Fig. 1 and then is turned 180° and pressed in the other direction to the stop. Successive rackets are passed through the same test.

The method of the present invention consists in the steps of: holding one section of an article which is to be tested; associating an amplifying apparatus, comprising a pickup, an amplifier and an indicating means, with the article; and then subjecting the other, or "not held" section of the article to certain predetermined strains or through a field of test. The indicating means may be of the visual and/or audible type.

One of the main advantages of the invention is as follows: When a racket is flexed through the field of test, if two adjoining laminations on wood surfaces are not adhered together at some point within the section under stress, as in the case of a lack of continuous glue line or a glue line which has already "let go," a rubbing action will occur between these laminations. This rubbing action may not be audible to the naked ear, but will give a characteristic sound in the amplifier. Other defects, such as a split in any of the wood members which allow two adjoining wood surfaces to slip upon each other will register this action.

Variations and modifications may be made within the scope of this invention and portions of the improvements may be used without others.

Having thus described the invention what is claimed as new is:

1. In a testing apparatus for the purpose of analyzing vibrations set up in bending an article, the combination of, means for receiving and holding an article which is to be tested; a stop device; means for maintaining the holding means and stop device in predetermined positions relative to each other and defining a predetermined field through which the article may be strained toward and to the stop device; amplifying apparatus; a contact microphone adapted to be positioned on the article to be tested at substantially the point of flexure; electrical means connecting said microphone and said amplifying apparatus; supporting means on said contact microphone; and indicating means in said amplifying apparatus adapted to signal the vibrations detected by the contact microphone as the article is strained through a predetermined field.

2. In a testing apparatus the combination of, holding means for an article which is to be tested; a locator in said holding means; means for maintaining said locator in divers positions relative to the holding means; a stop device; means for maintaining the holding means and stop device in divers positions relative to each other; and means adapted to be associated with the article which is to be tested and to indicate to at least one of the human senses the condition thereof as it is strained toward the stop device.

3. In a testing device for the purpose of analyzing the vibrations set up in bending an article, the combination of a base including a socket adapted to receive only a portion of an article to be tested; a stop device adapted to limit the movement of that portion of the article not within the socket when making a test by moving said portion not within the socket toward said stop device; an amplifier; a loudspeaker apparatus, an electrical pickup device adapted to be positioned on the article to be tested at substantially the point of flexure; and electrical means connecting said amplifier, loud speaker and pickup device.

4. In a testing device, the combination of a base; an adjustable top plate, said base and top plate defining a socket adapted to receive a portion only of an article which is to be tested; a stop device; adjustable means associating the stop device and the base, said adjustable means comprising a slotted portion and securing means passing through said slotted portion, adapted to adjustably position said stop device in the path of said article when making a test by bending and straining said article to said stop device; and amplifying apparatus comprising a pickup, an amplifier, and indicating means, said pickup being adapted to be superposed upon the article placed in the socket and positioned substantially at the point of flexure and said indicating means being adapted to indicate to at least one of the human senses the condition of the article when it is strained toward the stop device.

5. In a testing apparatus for the purpose of analyzing the vibrations set up in bending an article, the combination of holding means adapted to securely grip a portion only of an article which is to be tested; a stop device means including slotted portions and securing means passing therethrough for maintaining the holding means and the stop device relative to each other; detecting means actuated by normally inaudible vibrations set up by moving that portion of the article not gripped by the holder, said means being adapted to be associated with the article which is to be tested and positioned substantially at the point of flexure of said article; signalling means adapted to indicate to at least one of the human senses the condition of the article as part thereof is strained toward the stop devices; and means connecting said detecting and signalling means.

6. In a sporting implement testing apparatus, the combination of holding means for a portion only of a sporting implement which is to be tested; a locator in said holding means; means for maintaining said locator in divers positions relative to the holding means; a stop device; means for maintaining the holding means and stop device in divers positions relative to each other; a contact microphone adapted to be associated with the sporting implement which is to be tested; signalling means adapted to indicate to at least one of the human senses the condition of the sporting implement as it is strained toward the stop device; and electrical means associating said contact microphone and said signalling means.

7. The method of testing wood articles of the type described which includes the steps of bending one portion of an article a predetermined degree within the normal tolerance of an accepted standard article while another portion of said article is gripped in holding means; and detecting by microphonic means placed at substantially the point of flexure vibrations normally inaudible as an index of the condition of the article.

8. In a testing device, the combination of a holding clamp adapted to grip an article in such a manner that a portion of the article may be bent through a predetermined field; detecting means adapted to pick up the vibrations set up by said bending of a portion of the article and positioned substantially at the point of flexure; amplifying means; indicating means adapted to signal the nature of the vibrations set up by bending the article; and means cooperatively connecting said detecting means, amplifying means and indicating means.

LLOYD E. BURNS.
VICTOR T. FAHRINGER.